United States Patent [19]

Eicher

[11] Patent Number: 4,488,835

[45] Date of Patent: Dec. 18, 1984

[54] PENSTOCK FISH DIVERSION SYSTEM

[75] Inventor: George J. Eicher, Portland, Oreg.

[73] Assignee: Eicher Associates, Inc., Portland, Oreg.

[21] Appl. No.: 553,882

[22] Filed: Nov. 22, 1983

Related U.S. Application Data

[62] Division of Ser. No. 312,189, Oct. 16, 1981, abandoned.

[51] Int. Cl.³ .......................... E02B 5/08; E02B 8/08; A01K 61/00; B01D 33/00
[52] U.S. Cl. ........................................ 405/83; 405/78; 405/127; 210/154; 210/162; 119/3
[58] Field of Search ..................... 405/77, 78, 80–83, 405/127; 119/3; 210/154, 162, 131, 409, 155; 415/121 G

[56] References Cited

U.S. PATENT DOCUMENTS

| 2,169,249 | 3/1983 | Holmes et al. | 405/83 |
| 2,826,897 | 3/1958 | Vinsonhaler et al. | 405/81 |
| 4,064,048 | 12/1977 | Downs et al. | 405/81 X |

FOREIGN PATENT DOCUMENTS

| 487803 | 6/1938 | United Kingdom | 210/154 |
| 450012 | 12/1974 | U.S.S.R. | 405/81 |
| 682595 | 8/1979 | U.S.S.R. | 405/127 |
| 696099 | 11/1979 | U.S.S.R. | 405/82 |

Primary Examiner—C. J. Husar
Assistant Examiner—Nancy J. Stodola
Attorney, Agent, or Firm—Klarquist, Sparkman, Campbell, Leigh & Whinston

[57] ABSTRACT

A fish diversion system for a penstock housing a hydroelectric turbine employs large area screens to shunt fish to a bypass conduit above the turbine. The screens are disposed generally lengthwise of the penstock and the upstream screen is inclined upwardly at a shallow angle to maximize water flow velocity along the upstream screen while minimizing the approach velocity normal to the screens. Fish and debris are thus swept along the screens rather than impinged on them. The bypass conduit is sized and positioned to minimize bypass water flow volume while maintaining sufficient volume and velocity to discharge fish from the upper portion of the penstock. The upstream screen can be tiltable for cleaning.

4 Claims, 4 Drawing Figures

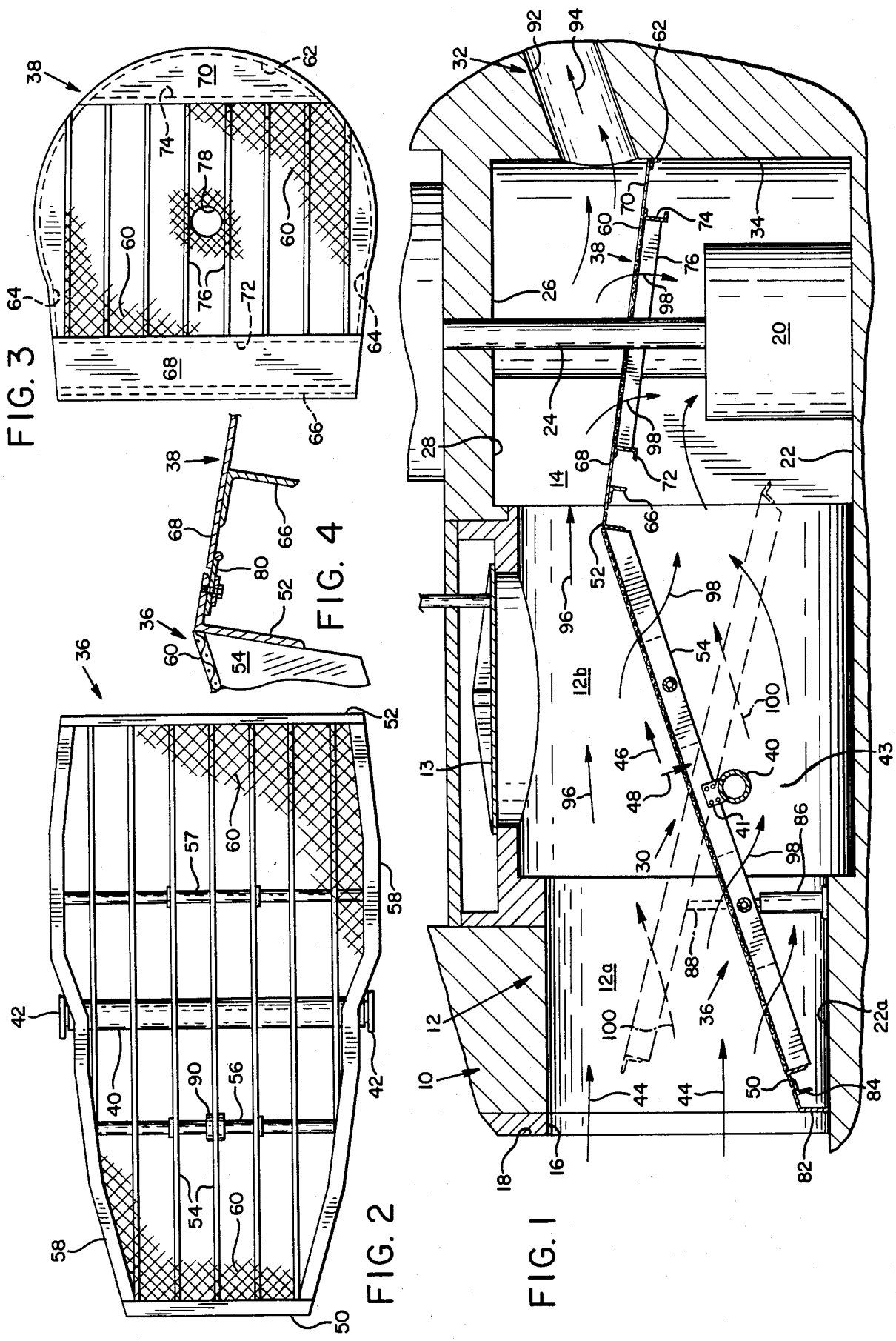

PENSTOCK FISH DIVERSION SYSTEM

This application is a division of application Ser. No. 312,189, filed Oct. 16, 1981, now abandoned.

BACKGROUND OF THE INVENTION

The invention relates generally to fish diversion apparatus and systems for facilitating movement of fish through dams and more particularly to means for diverting downstream-moving fish away from hydroelectric turbines.

A continuing problem in the exploitation of hydropower is the facilitation of up and downstream movement of fish, particularly anadromous species, through water impoundments. Use of fish ladders and other forms of artificial outlets has aided upstream migration of salmon and other fish.

However, such devices have not proven very useful as downstream migration routes for their offspring. In large bodies of impounded water, salmon and steelhead smolts cannot easily find the artificial outlet or ladder. When water levels are high, many smolts pass over the dam spillways. This is acceptable if the dam is low and water flow sufficient. However, water flow is frequently inadequate during the seasons of downstream migration of the smolts. And, if the dam is very high, the smolts are exposed to highly-nitrogenated water below the dam as well as the possibility of injury during their fall. Many smolts are thus lost. The only other alternative is for the smolts to pass downstream through the generator turbines. However, many more smolts are lost in the process.

To minimize losses of smolts in the turbines, the fish agencies frequently require maintenance of a minimum spillway flow regardless of water supply. However, doing so causes a substantial reduction in power generating capacity, especially during periods of low water flow.

Smolt mortality from the foregoing causes can be as high as 10% or more for each dam in a river that may contain half a dozen or more dams. Such a high cumulative mortality rate makes it difficult to maintain or replenish already depleted populations of anadromous fish. Thus, it is important to find a way to facilitate safe downstream passage of fish through dams without unduly impairing the generating capacity of the dams.

One proposed solution to the foregoing problem calls for positioning a moving or traveling screen across the forebay leading to the penstocks containing the turbines, for example, as disclosed in U.S. Pat. Nos. 2,169,249 and 4,064,048. In top plan view, the moving screen is positioned at a 45° angle to current flow into the forebay. However, such a screen is a large, bulky and expensive apparatus. Also, by virtue of the need for its moving parts to operate continuously to prevent plugging with debris, such a screen is subject to breakdown.

A second proposal involved positioning of a louver screen generally parallel to the flow of water in the forebay across the entrances to all of the penstocks except the one at the downstream end of the forebay. A similar system using a separate bypass is cisclosed in U.S. Pat. No. 2,826,897. A wall on the opposite side of the forebay from the louver screen converges toward the downstream end penstock, which is provided with leaf gates to retain fish therein. The object of this system is to move most of the fish with the flow past the louver-screened penstocks to the end penstock or bypass provided with a 50 cubic foot per second (cps) bypass. Testing over a two year period disclosed that about 75% of the fish entering the forebay were guided by the louvers into the end penstock. Since this system was only experimental, the turbine was not removed from the end penstock. Although many fish escaped through the bypass, many more fish passed through the turbine and were injured. The large capacity of the bypass reduced generating capacity of the end unit by over 10%. For permanent use, the fish agencies proposed removing the turbine from the end penstock and using the entire 450 cps water supply as a bypass flow. However, doing so would cost greatly in lost generating capacity.

Another approach was to provide an artifical spillway into a sump. A hump-backed skimmer screen was positioned between the reservoir and the sump with its hump at the water surface. Water flowing over the screen carried the fish into the sump. The fish and a portion of the water was discharged into the river below the dam while the rest of the water was pumped back into the reservoir. This screen requires apparatus for raising and lowering it to adjust to variations in water levels. A debris screening system disclosed in British Pat. No. 487,803 is likewise susceptible to changes in water level, and therefore would be unreliable as a fish bypass.

It has also been proposed to individually screen the entrances of the penstocks. However, this approach is unsatisfactory because the screens would quickly plug with water borne debris and, by resisting water flow, substantially reduce the efficiency of power generation.

Yet another system that has been tried calls for only screening the upper portion of the entrance of each penstock. Such a screen, when viewed in a side elevational view, is positioned along the downwardly convergent ceiling of the penstock at approximately a 45° angle from horizontal. The screen's upper end contacts the ceiling of the penstock entrance just downstream of the gate well, which serves as a bypass. The lower end of the screen, upstream of the gate well, is spaced well above the floor of the entrance to the penstock. This system did not work very well. The approach velocity of water to the screen was about 4 to 6 feet per second. The gate well, having its outlet opening at the level of the surface of the reservoir, had a very low bypass flow. As a result, many of the fish that did not swim beneath the screen were impinged on it and trapped there by the high velocity of the water flow through the screen. The screen was tiltable for cleaning and for releasing trapped fish but many such fish were badly descaled and thus lost.

Accordingly, there remains a need for a satisfactory means for fish to migrate downstream past dams without passing through the generator turbines.

SUMMARY OF THE INVENTION

One object of the invention is to enable freer downstream passage of fish through dams.

Another object of the invention is to reduce mortality of migrating fish as they pass downstream through hydroelectric dams.

Another object of the invention is to prevent downstream migrating fish from passing through turbines.

A more particular object is to cause fish entering penstocks to be diverted from entry into the turbines.

A further object of the invention as aforesaid is to avoid degrading power generation efficiency.

These objects are fulfilled by a fish diversion system comprising a screening means extending from side to side in the penstock for diverting fish into an upper portion of the penstock and bypass means above the screening means for discharging a portion of the water and any fish therein from the upper portion of the penstock. The screening means extends from the floor in the entrance of the penstock to the downstream end of the penstock above the turbine. It preferably has an upward inclination such that the major velocity component of the downstream water flow into the penstock is parallel to the screening means. With the screening means oriented at about 35% upslope (about 19°); sufficiently large surface area is presented to the water flow to the turbine that the approach velocity of the water to the screening means is less than about 1.8 to 2 feet per second (fps) and the flow velocity along the screening means is twice as great. This arrangement avoids impinging the fish and any debris on the screening means. The bypass means has an inlet above the screening means and an outlet at a level relative to the surface of the reservoir sufficient to maintain a flow rate through the bypass and along the surface of the screening means sufficient to discharge the fish from the upper portion of the penstock out through the bypass means, for example, about 4 to 6 feet per second. The bypass means is preferably sized so that only a few percent of the water flow volume into the penstock bypasses the turbines.

The screening means is preferably constructed in two portions, an upstream portion and a downstream portion. The upstream portion can be tiltable for cleaning away debris, but need not be if it is inclined upwardly at a shallow enough angle and has sufficient surface area that debris is swept along the screen, rather than impinged on it.

The foregoing system has proven successful in bypassing fish around generators without loss of fish due to impingement on the screens and without unduly constricting the flow of water through the screen to the turbine. In fact, an unexpected result has occurred from the use of the system in that it is no longer necessary to spill water over the dam in order to enable downstream passage of migrating fish. The entire water flow can be directed through the penstocks with a resultant increase in power generation capacity, even during periods of low water. Moreover, directing most of the water flow through the turbines, rather than spilling a portion of it over the spillway, substantially reduces nitrogenation of the water downstream of the dam. Thus, not only are losses of fish due to passage through the turbines and over the spillways reduced, but downstream losses due to nitrogen narcosis are reduced while power generation is increased.

The foregoing and other objects, features and advantages of the invention will become more readily apparent from the following detailed description of a preferred embodiment which proceeds with reference to the drawing.

BRIEF DESCRIPTION OF THE DRAWING

FIG. 1 is a longitudinal cross-sectional view of a penstock incorporating a penstock screen and fish bypass in accordance with the invention, the tiltable upstream screen being shown in phantom lines tilted into cleaning position.

FIG. 2 is a top plan view of the tiltable upstream screen of FIG. 1, portions of the screen being cut away to disclose underlying construction.

FIG. 3 is a top plan view of the fixed downstream screen of FIG. 1, portions of the screen being cut away to disclose underlying construction.

FIG. 4 is an enlargement of portion of FIG. 1 showing details of the junction between the two screens at their apex.

DETAILED DESCRIPTION OF PREFERRED EMBODIMENT

Referring to FIG. 1, a typical penstock 10 is a structural concrete cul-de-sac comprising a horizontally-oriented cylindrical conduit or draft tube 12 intersecting a vertically oriented cylindrical chamber 14. The draft tube 12 forms an entrance to the penstock and can include conduit portions 12a, 12b of different diameters, the larger portion 12b including a normally-closed hatchway 13. The entrance to the penstock ordinarily includes a head gate 16 which is retracted upwardly into a gate well 18 to admit water to the penstock. A turbine 20 is mounted on the floor 22 of the cylindrical chamber for rotation about a vertical shaft 24 extending through the chamber ceiling 26 at a position concentric with the chamber sidewalls 28. Submerged at the base of a dam (not shown), the penstock 10 is filled with water under pressure to establish a water flow through the turbine 20, causing it to rotate on shaft 24.

The fish diversion system of the present invention comprises a screening means 39 for diverting fish into an upper portion of the penstock and a bypass means 32 for discharging a portion of the water in the upper portion of the penstock and any fish therein from the penstock. The screening means 30 extends downstream at a shallow upward inclination from the floor of the penstock 22a near the head gate to the downstream end wall 34 of the penstock 34 below the bypass means 32.

The screening means is preferably constructed in two parts: an upstream portion 36 and a downstream portion 38, best seen in FIGS. 2 and 3, respectively. The combined surface area of the two screen portions is much greater than the cross-sectional area of conduit 12a, on the order of three times as large.

The upstream screen portion 36 extends from side to side across the draft tube. It is preferably mounted on a horizontal pivot shaft 40 by means of brackets 41. Bearing housings 42 on each end of the shaft are secured to opposite sidewalls 44 of conduit portion 12b. Portion 36 has an outer frame structure formed of structural frame angle members 50, 52, 58 contoured to approximately a pear shape to conform to the shape of the sidewalls of conduit portions 12a, 12b.

The shape of the screen portions can vary in accordance with the cross sectional configuration of the penstock and the angle at which the screens are positioned therein. In turn, the angle of the screen portions in the penstrock and their surface areas are adjusted to insure that fish and debris are swept along the screens rather than impinged on them and vary with the velocity of water flow 44 into the penstock and out the bypass. The upsloping screen translates flow 44 into a flow component 46 parallel to the upstream screen portion and a flow component 48 through the screen normal to component 46. The resultant velocity of flow component 46 along the screen is preferably more than twice the velocity of flow component 48 through the screen. The surface area and the angle of the screens are adjusted to maintain the velocity of water flow normal to the screens safely below the approach velocity at which fish and debris would be impinged on or plastered against the screens.

In the illustrated embodiment, which is merely an example, the upstream screen portion is positioned at a 35% upslope, or about 19.3° angle from horizontal, for a horizontal water flow 44 of water into the penstock at a velocity of 4-6 fps. Approach flow velocity is about 1.8 feet per second, at which no impingement occurs.

Returning to the structure of the upstream screen portion, the outer periphery of the frame includes parallel upstream and downstream end frame members 50, 52 extending between mirror-image side frame members 58. Extending lengthwise between members 50, 52 are a series of spaced-apart, parallel flat rib members 54 arranged with their narrow dimension normal to the water flow. Two tubular members 56, spaced at intervals between the end members 50, 52 extend through the rib members 54 and are secured at their ends to the side frame members 58. Secured atop the rib members 54 and supported thereby is a screen 60. Although the screen is represented symbolically as a grid-type screen, it is preferable to use Johnson wedge wire screen in which the wires are oriented parallel to ribs 54. The preferred screen has 2 mm. width wires and 2 mm. spacing between the wires.

Similarly, the downstream screen portion 38 is contoured to conform to the cylindrical shape of turbine chamber 14. It is set in the chamber at approximately a 15%, or 8.5°, downslope and, accordingly, the downstream portion of its outer frame is formed of a frame angle member 62 having a generally elliptical shape. The upstream portion is framed along its sides by two straight frame angle members 64 and at its upstream end by a straight angle member 66 extending horizontally from side to side across the downstream end of conduit 12b. The side frame members are welded to the ends of the elliptical frame member 62 and converge slightly to conform to sides of the penstrock. A trapezoidal plate member 68 and a crescent-shaped plate member 70 extend from side to side across the top of screen portion 38 at its up and downstream ends. A pair of spaced-apart channel members 72, 74 extend from side to side across the outer frame along the inner margins of plates 68, 70, respectively. Spaced-apart, parallel, flat rib members 76, similar to rib members 54, extend lengthwise between channel members 72, 74. Johnson wedge wire screen 60 is secured atop ribs 76. At the center of the downstream screen portions, between the centermost rib members 76, is a circular opening 78 through the screen for turbine shaft 24. Screen portion 38 is removably secured in a fixed position in the turbine chamber by brackets (not shown).

As mentioned above, the upstream screen portion 36 is mounted for tilting on shaft 40. Accordingly, referring to FIG. 4, its downstream angle member 52 has a flat strip 80 bolted to its underside in position to separably abut the underside of the upstream end of plate 68. Referring to FIG. 1, at the upstream end of screen portion 36, an angled plate member 82 is secured to the floor of the conduit 12a just downstream of the head gate. When viewed from upstream, member 82 has a crescent shape to conform to the curved floor 22a of conduit 12a. The upper end of member 82 is angled downstream and has a reinforcing angle member 84 welded to its underside in position for frame angle 50 to rest on it. A hydraulic cylinder 86 is pivotally mounted (not shown) at its lower end to the floor of conduit 12a. Its ram 88 has a clevis end 90 connected to tubular member 56. Extending the ram raises the upstream end of screen portion 30 to a cleaning position, shown in phantom lines in FIG. 1.

Bypass means 32 comprises a bypass pipe 92, with an inlet opening connected into an upper portion of the turbine chamber above screen portion 38, extending through end wall 34. The bypass pipe could equally as well be connected to the turbine chamber through ceiling 26. Pipe 92 extends at an upward inclination in the downstream direction to an outlet (not shown) at a level sufficiently below the surface of the water behind the dam to provide a water flow, indicated by arrow 94, from the upper portion of the penstock at a velocity greater than that flowing over the apex of the screen, or 6–10 fps. The bypass pipe is sized relative to conduit 12a such that only a small portion of the water entering the penstock escapes via the bypass. In one example, conduit 12a has a diameter of 10 feet and bypass pipe 92 has a diameter of 2.5 feet. The resultant water flows are approximately 450 cubic feet per second entering the penstock and about 50 cubic feet per second flowing out through the bypass pipe.

OPERATION

In normal operation, the head gate 16 of the penstock is raised and the penstock is completely filled with water under pressure determined by the head behind the dam. Water flows horizontally into the penstock conduit 12a, as indicated by arrows 44. As the water flows downstream through the draft tube, a major component 46 of water flow velocity is along the upstream portion of the screening means, carrying any fish and debris into the upper portion of the penstock as indicated by arrows 96. At the same time, most of the volume of water flows through the upstream and downstream screen portions 36, 38, as indicated by arrows 98, at a substantially lower velocity, as indicated by arrow 48. The approach velocity of water to the screens is thus less than 1.8 to 2.0 fps. This velocity is low enough to prevent impingement of fish and debris against the screen while the flow velocity along the screen, toward the bypass means, is sufficient to sweep the fish along into the upper portion of the penstock and discharge them out through the bypass pipe 92. The constricted passageway between the apex of the screen portions and the ceiling of conduit 12a helps retain the fish in the space above screen portion 38. The fish and water can be discharged at the outlet of pipe 92 into a fish ladder if such is available. Otherwise, the fish and water are simply discharged into the water below the dam.

If a steeper slope of screen is used than that shown in the preferred embodiment, the screen portions may require occasional cleaning. To do so without interrupting the operation of the turbine, cylinder 86 is actuated to raise the upstream screen portion to the cleaning position shown in phantom lines shown in FIG. 1. Such portion is preferably tilted for cleaning to a 25% or 14° downslope. In this position, a portion of the water flow into the penstock is from bottom to top through the screen as indicated by arrows 100. Such flow removes any debris impinged on the top of the screen and flushes it out of the penstock through the turbine 20.

The foregoing fish diversion system can be installed in each penstock at a hydroelectric plant. Alternatively, such a system can be installed solely in the penstock at the downstream end of the forebay and the fish diverted thereto from the other penstocks by, for example, the louver system described in the background of the invention. In the first arrangement, no more than about 2% of the water flow into each penstock will be lost through the bypass means, reducing generating efficiency of each penstock/turbine unit by a corresponding amount. In the latter system, the generating efficiency of only the last unit will be reduced by that amount. In either case, the losses are more than made up for by the ability to direct up to the entire downstream flow of water through the turbines without disrupting the downstream migration of the fish. If desired, additional generating units can be added to a dam to utilize peak water flows as well. Because all of the water can pass through the turbines, without any need to spill water over the dam to facilitate downstream movement of fish, nitrogenation of waters below the dam by spillwater is significantly reduced except during periods of peak stream flow.

Having illustrated and described a preferred embodiment of my invention, it should be apparent to those skilled in the art that such embodiment may be modified in arrangement and detail without departing from the invention. I claim all modifications which come within the spirit and scope of the following claims.

I claim:

1. A method of conveying downstream migratory fish around a dam including a penstock housing a water intake for a turbine powered by water stored behind the dam, the method comprising:

providing a penstock at an elevation spaced below an upper atmospheric surface of the water stored behind the dam so as to provide a water pressure at said elevation which is sufficient to drive a turbine;

admitting water and any fish therein from behind the dam into the penstock so as to fill the penstock with water under said pressure and to establish a downstream flow of water through the turbine at a first velocity within the penstock such that said fish are swept into the penstock;

diverting said fish into an upper region of the water-filled pressurized penstock above said intake while allowing all but a small portion of the downstream flow of water to pass through the turbine; and discharging said small portion of water and any fish therein under said pressure from the upper region of the penstock in a bypass flow having a second velocity such that the fish are swept out of the penstock and discharged below the dam in said bypass flow.

2. A method according to claim 1 in which the diverting step includes providing a screen extending side to side across the penstock and sloping upwardly from bottom to top of the penstock proceeding in a downstream direction at an angle to the downstream flow such said downstream flow has a component of velocity over the screen sufficient to sweep said fish into said upper region of the penstock.

3. A method according to claim 1 in which said water flow velocities are at least four feet per second.

4. A method according to claim 1 in which substantially all water released from storage behind the dam is admitted to and passed through a penstock in accordance with the steps of claim 1 thereby to minimize atmospheric spillage of water over the dam.

* * * * *